US012799301B2

(12) United States Patent
Takeuchi et al.

(10) Patent No.: US 12,799,301 B2
(45) **Date of Patent: *Nov. 17, 2026**

(54) COMPOUND FOR BONDED MAGNETS, MOLDED BODY AND BONDED MAGNET

(71) Applicant: Showa Denko Materials Co., Ltd., Tokyo (JP)

(72) Inventors: Kazumasa Takeuchi, Tokyo (JP); Teruo Itoh, Tokyo (JP); Arisa Taira, Tokyo (JP); Kosuke Urashima, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 897 days.

This patent is subject to a terminal disclaimer.

(21) Appl. No.: 18/014,592

(22) PCT Filed: Jul. 13, 2021

(86) PCT No.: PCT/JP2021/026302

§ 371 (c)(1),
(2) Date: Jan. 5, 2023

(87) PCT Pub. No.: WO2022/014593

PCT Pub. Date: Jan. 20, 2022

(65) Prior Publication Data

US 2023/0250257 A1 Aug. 10, 2023

(30) Foreign Application Priority Data

Jul. 14, 2020 (JP) ................................ 2020-120780

(51) Int. Cl.

| | |
|---|---|
| ***C08K 5/098*** | (2006.01) |
| ***B22F 1/102*** | (2022.01) |
| ***B22F 1/103*** | (2022.01) |
| ***B22F 1/107*** | (2022.01) |
| ***B22F 3/02*** | (2006.01) |
| ***B22F 3/24*** | (2006.01) |
| ***C08K 3/08*** | (2006.01) |
| ***C08K 5/5435*** | (2006.01) |
| ***H01F 1/057*** | (2006.01) |

(52) U.S. Cl.

CPC .............. *C08K 5/098* (2013.01); *B22F 1/102* (2022.01); *B22F 1/103* (2022.01); *B22F 1/107* (2022.01); *B22F 3/02* (2013.01); *C08K 3/08* (2013.01); *C08K 5/5435* (2013.01); *H01F 1/0571* (2013.01); *B22F 2003/248* (2013.01); *B22F 2201/02* (2013.01); *B22F 2301/45* (2013.01); *B22F 2302/45* (2013.01); *B22F 2998/10* (2013.01); *B22F 2999/00* (2013.01); *C08K 2003/0856* (2013.01); *C08K 2201/01* (2013.01)

(58) Field of Classification Search

CPC ........ C08K 5/098; C08K 3/08; C08K 5/5435; C08K 2003/0856; C08K 2201/01; C08K 3/38; C08K 5/5419; B22F 1/102; B22F 1/103; B22F 1/107; B22F 3/02; B22F 2003/248; B22F 2201/02; B22F 2301/45; B22F 2302/45; B22F 2998/10; B22F 2999/00; B22F 1/105; H01F 1/0571; H01F 1/0578; H01F 1/083; C08G 59/3218; C08G 59/688; C22C 2202/02; C08L 63/00

See application file for complete search history.

(56) References Cited

U.S. PATENT DOCUMENTS

| | | | | |
|---|---|---|---|---|
| 4,063,000 | A * | 12/1977 | Aonuma | H01F 1/061 427/127 |
| 11,732,124 | B2 * | 8/2023 | Takeuchi | C08G 59/621 252/62.54 |
| 2012/0219451 | A1 * | 8/2012 | Hanejko | B22F 3/02 428/407 |
| 2013/0181802 | A1 | 7/2013 | Watanabe | |
| 2014/0138569 | A1 | 5/2014 | Otsuka et al. | |

FOREIGN PATENT DOCUMENTS

| | | | |
|---|---|---|---|
| EP | 3719050 | A1 | 10/2020 |
| JP | 2001-214054 | A | 8/2001 |
| JP | 2004-031786 | A | 1/2004 |
| JP | 2005-317937 | A | 11/2005 |
| JP | 2012-209484 | A | 10/2012 |
| JP | 2013-138159 | A | 7/2013 |
| JP | 2015-070028 | A | 4/2015 |
| JP | H8-273916 | A | 10/2020 |
| JP | 7020603 | B1 | 2/2022 |
| WO | 2019/106813 | A1 | 6/2019 |

OTHER PUBLICATIONS

Machine translation of JP 2005-317937 (cited in Patent No. 12,053,820 forming basis for double patenting rejection in this application).
Machine translation of JP 2015-070028 (cited in Patent No. 12,053,820 forming basis for double patenting rejection in this application).

* cited by examiner

*Primary Examiner* — Andrew J. Oyer
(74) *Attorney, Agent, or Firm* — FITCH, EVEN, TABIN & FLANNERY, LLP

(57) ABSTRACT

A compound for bonded magnet that increases the mechanical strength (for example, crushing strength) of a bonded magnet is provided. The compound for bonded magnet includes a magnetic powder, an epoxy resin, a curing agent, a coupling agent, and a metal salt, and the metal salt is represented by $R_2M$, in which R represents a saturated fatty acid group having 6 or more and 10 or less carbon atoms, while M represents at least one metal element selected from Ca and Ba.

10 Claims, No Drawings

COMPOUND FOR BONDED MAGNETS, MOLDED BODY AND BONDED MAGNET

CROSS-REFERENCE TO RELATED APPLICATIONS

This application is a U.S. national phase application filed under 35 U.S.C. § 371 of International Application No. PCT/JP2021/026302, filed Jul. 13, 2021, designating the United States, which claims priority from Japanese application No. 2020-120780, filed Jul. 14, 2020, which is incorporated herein by reference in its entirety.

TECHNICAL FIELD

The present disclosure relates to a compound used for bonded magnet, a compact (molded body), and a bonded magnet.

BACKGROUND ART

A bonded magnet is a magnet obtained by compaction of a compound for bonded magnet into a predetermined shape at a high pressure and curing the resin in the compound. The compound for bonded magnet is a mixture including a magnetic powder, a resin (binding agent), a curing agent, a coupling agent, and the like. Since the compound is easily compacted, the degree of freedom of the shape and dimension of a bonded magnet are high as compared with sintered magnets. That is, bonded magnets having various shapes and dimensions, such as a bonded magnet having a thin ring shape, can be easily produced by compaction of the compound. Furthermore, since a bonded magnet includes not only a magnetic component but also a binding agent, cracking and chipping of the bonded magnet are less likely to occur as compared with sintered magnets. In addition, the compound for bonded magnet can be integrally compacted with other members. Furthermore, since an insulating binding agent exists between magnetic particles in a bonded magnet, the bonded magnet can have high electrical resistance. For the above-described reasons, the use applications of bonded magnets include many different things. For example, bonded magnets are utilized in automobiles, general electrical appliances, communication equipment, acoustic equipment, medical equipment, general industrial equipment, or the like.

A bonded magnet is produced by compacting a powder of a compound including a lubricating agent such as a metal soap (for example, zinc stearate) or a wax in a die. However, since a bonded magnet includes a resin as a binding agent, the mechanical strength of the bonded magnet is markedly decreased by softening of the resin resulting from heating of the bonded magnet. Particularly, at a high temperature, the crushing strength of the bonded magnet is likely to be decreased. Therefore, it was difficult to use conventional bonded magnets in an environment where heat resistance is required.

In order to enhance the heat resistance of the bonded magnet, it has been investigated to use various thermosetting resins. For example, Patent Literature 1 discloses a binding agent including each of an epoxy resin and a polybenzimidazole at a certain ratio as resins that increase the mechanical strength of a rare earth bonded magnet at a high temperature. Furthermore, Patent Literature 2 discloses a compound having a dihydrobenzoxazine ring, a mixture of a compound having a dihydrobenzoxazine ring and an epoxy resin, or a mixture of a compound having a dihydrobenzoxazine ring and a phenol resin, as a binding agent for a rare earth bonded magnet. Furthermore, Patent Literature 3 discloses a polyamideimide resin as a binding agent for a rare earth bonded magnet. In Patent Literature 4, it is described to produce a bonded magnet having a high density by using a green compact that in which cracks are less likely to occur even when a raw material powder having a reduced amount of resin is compacted at a high pressure.

CITATION LIST

Patent Literature

Patent Literature 1: Japanese Unexamined Patent Publication No. H08-273916

Patent Literature 2: Japanese Unexamined Patent Publication No. 2001-214054

Patent Literature 3: Japanese Unexamined Patent Publication No. 2004-31786

Patent Literature 4: Japanese Unexamined Patent Publication No. 2012-209484

SUMMARY OF INVENTION

Technical Problem

An object according to an aspect of the present invention is to provide a compound used for bonded magnet that increases the mechanical strength (for example, crushing strength) of a bonded magnet, a compact including the compound for bonded magnet, and a bonded magnet including a cured product of the compound for bonded magnet.

Solution to Problem

A compound for bonded magnet according to an aspect of the present invention includes a magnetic powder, an epoxy resin, a curing agent, a coupling agent, and a metal salt, the metal salt is represented by $R_2M$, R represents a saturated fatty acid group having 6 or more and 10 or less carbon atoms, and M represents at least one metal element selected from Ca and Ba.

At least a portion of the epoxy resin may be a naphthalene type epoxy resin having a naphthalene structure.

The naphthalene type epoxy resin may be at least one selected from a trifunctional epoxy resin and a tetrafunctional epoxy resin.

At least a portion of the curing agent may be a phenol resin, and the ratio of the hydroxyl group equivalent of the phenol resin to the epoxy equivalent of the epoxy resin may be 1.0 or more and 1.4 or less.

At least a portion of the coupling agent may have a succinic anhydride group.

A compound for bonded magnet according to an aspect of the present invention may include: a first powder including a magnetic powder and a resin composition covering each of magnetic particles constituting the magnetic powder; and a second powder including the metal salt, and the resin composition may include an epoxy resin, a curing agent, and a coupling agent.

A compact according to an aspect of the present invention includes the compound for bonded magnet.

At least a portion of the surface of a portion or all of the magnetic particles constituting the magnetic powder within the compact may be covered with the resin composition, the resin composition may include an epoxy resin, a curing agent, and a coupling agent, and the metal salt may be dispersed in the compact.

A bonded magnet according to an aspect of the present invention includes a cured product of the compound for bonded magnet.

At least a portion of the surface of a portion or all of the magnetic particles constituting the magnetic powder in the bonded magnet may be covered with the resin composition, the resin composition may include an epoxy resin, a curing agent, and a coupling agent, and the metal salt may be dispersed in the bonded magnet.

Advantageous Effects of Invention

According to an aspect of the present invention, there are provided a compound for bonded magnet that enhances the mechanical strength (for example, crushing strength) of a bonded magnet, a compact including the compound for bonded magnet, and a bonded magnet including a cured product of the compound for bonded magnet.

DESCRIPTION OF EMBODIMENTS

Hereinafter, suitable embodiments of the present invention will be described. The present invention is not intended to be limited to the following embodiments.

[Overview of Compound for Bonded Magnet, Compact, and Bonded Magnet]

The compound for bonded magnet according to the present embodiment includes a magnetic powder, an epoxy resin, a curing agent, a coupling agent, and a metal salt. The metal salt is represented by $R_2M$. R represents a saturated fatty acid group having 6 or more and 10 or less carbon atoms. M represents at least one divalent metal element selected from Ca (calcium) and Ba (barium). The compound that will be described below means "a compound for bonded magnet".

When a bonded magnet is produced from a compound including a metal salt represented by $R_2M$, the bonded magnet has high mechanical strength (crushing strength and the like), and a decrease in the mechanical strength (crushing strength and the like) of the bonded magnet at a high temperature is suppressed. That is, when the saturated fatty acid group R has 6 or more and 10 or less carbon atoms, and M is at least one metal element selected from Ca and Ba, the bonded magnet has high mechanical strength (crushing strength and the like), and a decrease in the mechanical strength (crushing strength and the like) of the bonded magnet at a high temperature is suppressed. The mechanical strength of the bonded magnet at a high temperature is, for example, the mechanical strength of the bonded magnet at a temperature of 100° C. or higher and 200° C. or lower.

When R has fewer than 6 carbon atoms, the compound is less likely to have sufficient flowability and mold releasability, it is difficult to compact the compound, the bonded magnet is less likely to have desired shape and dimension, and the bonded magnet is less likely to have high mechanical strength (crushing strength and the like) at room temperature and at a high temperature. When R has more than 10 carbon atoms, the bonded magnet is less likely to have high mechanical strength (crushing strength and the like) at room temperature and at a high temperature. The mechanism by which a decrease in the mechanical strength of the bonded magnet is suppressed in the present embodiment is not necessarily clearly understood. The inventors consider that a decrease in the mechanical strength of the bonded magnet is suppressed by the following mechanism.

When the compound includes a zinc salt of a long-chain saturated fatty acid, such as zinc stearate, as a lubricating agent instead of the metal salt $R_2M$, the lubricating agent is easily dispersed in the binder resin (cured product of the resin composition) included in a dust core formed from the compound. In contrast, when the bonded magnet is formed from a compound including the above-described metal salt $R_2M$ as a main lubricating agent, a large amount of the metal salt $R_2M$ is likely to exist in the vicinity of the surface of the bonded magnet, and the amount of the metal salt $R_2M$ existing in the inner part of the bonded magnet (portion remote from the surface of the bonded magnet) is small. As a result, a decrease in the mechanical strength of the binder resin (cured product of the resin composition) included in the inner part of the bonded magnet is suppressed, and a decrease in the mechanical strength of the bonded magnet is also suppressed. The reason why the state of existence of the metal salt $R_2M$ in the bonded magnet is different from the state of existence of a long-chain saturated fatty acid salt (zinc stearate or the like) in the bonded magnet, is that the compatibility of the metal salt $R_2M$ constructed of at least any one of Ca and Ba with the resin composition is different from the compatibility of the long-chain saturated fatty acid salt constructed of Zn with the resin composition. The reason why the lubrication performance of the metal salt $R_2M$ constructed of a short alkyl chain (R) as compared with a long-chain saturated fatty acid group (stearic acid group or the like) can be maintained, is considered to be attributable to the above-described mechanism. However, the technical scope of the present invention is not intended to be limited by the mechanism.

When R is a saturated fatty acid group having 6 or more and 10 or less carbon atoms, rust of the magnetic powder in a compact (compact before heat treatment) formed from the compound is easily suppressed, and rust of the magnetic powder in a bonded magnet (compact after heat treatment) formed from the compound is also easily suppressed. For example, rust of the magnetic powder in the compact and in the bonded magnet in the presence of water is easily suppressed.

The inventors speculate that rust of the magnetic powder in the compact and in the dust core in the presence of water is suppressed by the following mechanism.

With regard to the compact formed from the compound, at least a portion of the surface of a portion or all of the magnetic particles constituting the magnetic powder is covered with the resin composition, and the metal salt is dispersed in the compact. The metal salt may exist in the resin composition included in the compact. Furthermore, also with regard to the bonded magnet (compact after heat treatment) formed from the compound, at least a portion of the surface of a portion or all of the magnetic particles constituting the magnetic powder is covered with the resin composition (uncured resin composition or a cured product of the resin composition), and the metal salt is dispersed in the bonded magnet. The metal salt may exist in the resin composition included in the bonded magnet. When the surface of the magnetic particles is exposed without being covered with the resin composition, there is a possibility that the exposed surface of the magnetic particles may come into direct contact with water. As a result, the exposed surface of the magnetic particles is likely to be oxidized by water, and rust is likely to generated. However, when R is a saturated fatty acid group having 6 or more and 10 or less carbon atoms, saturated fatty acid ions ($R^-$) are likely to be produced as a result of dissociation of the metal salt ($R_2M$) in water, and oxygen ($O^-$) in the carboxylate group (—$COO^-$) constituting the saturated fatty acid ion is likely to be bonded to a metal element (for example, iron) located on the exposed surface of a metal particle. As a result, the surface of magnetic particles that are not covered with the resin composition is covered with saturated fatty acid groups, and the saturated fatty acid groups suppress oxidation of the surface of the magnetic particles. That is, the saturated fatty acid groups derived from the metal salt suppress direct contact between the surface of the magnetic particles and water and suppress rust of the magnetic powder in the compact and in the bonded magnet. When R has more than 10 carbon atoms, since the metal salt ($R_2M$) is less likely to be dissociated in water, and saturated fatty acid ions ($R^-$) are less likely to be produced, it is difficult to suppress rust of the magnetic powder in the compact and in the bonded magnet. That is, a magnetic powder in a compact including a metal salt with an R having more than 10 carbon atoms, is likely to be rusted in a short period of time in the presence of water, as compared with a magnetic powder in a compact including a metal salt with an R having 6 or more and 10 or less carbon atoms. As is the case of the compact, the magnetic powder in a bonded magnet including a metal salt with R having more than 10 carbon atoms is likely to rust in a short period of time in the presence of water, as compared with the magnetic powder in a bonded magnet including a metal salt with R having 6 or more and 10 or less carbon atoms.

From the viewpoint that rust of the magnetic powder in the compact and in the bonded magnet is more likely to be suppressed, R may be a saturated fatty acid group having 6 or more and 8 or less carbon atoms.

The compound may be a mixture including a magnetic powder, an epoxy resin, a curing agent, a coupling agent, and the metal salt $R_2M$. In the following description, for illustrative purposes, a component including a resin (epoxy resin or the like), a curing agent, and a coupling agent will be described as "resin composition". That is, a resin composition may be a component that can include a resin (epoxy resin or the like), a curing agent, a coupling agent, and additives, and may be a residual component (non-volatile component) remaining after excluding an organic solvent and the magnetic powder. The additives are the remainder component remaining after excluding the resin (epoxy resin or the like), the curing agent, and the coupling agent from the resin composition. The additives may be, for example, a curing accelerator and a flame retardant. The resin composition may also include the metal salt $R_2M$ as an additive. The resin composition may also include a wax as an additive.

The resin composition functions as a binder that binds the individual magnetic particles constituting the magnetic powder to one another and imparts mechanical strength to a compact formed from the compound. For example, when the compound is formed at a high pressure by using a die, the resin composition fills the spaces between the magnetic particles and binds the magnetic particles to one another. Thus, by curing the resin composition in the compact, a cured product of the resin composition binds the magnetic particles more firmly, and thus a bonded magnet having high mechanical strength is obtained.

The content of the magnetic powder in the compound may be 95% by mass or more and 99.5% by mass or less, and more preferably 96% by mass or more and 99% by mass or less, with respect to the total mass (100% by mass) of the magnetic powder and the resin composition. When the content of the magnetic powder is within the above-described range, the bonded magnet has excellent magnetic characteristics, and both the mechanical strength and the heat resistance of the bonded magnet are likely to be achieved in a well-balanced manner.

The compound may be a powder. For example, the compound may include a first powder including a magnetic powder and a resin composition that covers each of the magnetic particles constituting the magnetic powder; and a second powder including the metal salt $R_2M$. That is, the individual particles constituting the first powder may each have a magnetic particle and a resin composition covering the surface of the magnetic particle. The individual particles constituting the first powder may be composed only of a magnetic particle and a resin composition. The individual particles constituting the second powder may include the metal salt $R_2M$. The individual particles constituting the second powder may be composed only of the metal salt $R_2M$. For example, when the metal salt $R_2M$ functions as a wax, the individual particles constituting the second powder may be composed only of the metal salt $R_2M$. The individual particles constituting the second powder may include both the metal salt $R_2M$ and a wax different from the metal salt. The individual particles constituting the second powder may be composed only of the metal salt $R_2M$ and the wax. The compound may be a mixture of the first powder and the second powder. The first powder and the second powder in the compound may be uniformly mixed. The compound may be composed only of the first powder and the second powder. The compound may be composed only of one kind of powder in which a magnetic powder, a resin composition, and the metal salt $R_2M$ are integrated. The compound may be composed only of one kind of powder in which a magnetic powder, a resin composition, the metal salt $R_2M$, and a wax different from $R_2M$ are integrated.

As the compound has a second powder composed only of the metal salt $R_2M$, or a second powder including the metal salt $R_2M$ and another wax, the entire compound can have excellent flowability derived from the metal salt or wax. Excellent flowability may be rephrased as a property that the compound can easily flow. A conventional compound powder that does not include the second powder has inferior flowability as compared with a compound including the first powder and the second powder. For example, a compound powder composed only of one kind of powder in which magnetic particles, a resin composition, and the metal salt $R_2M$ are integrated tends to have inferior flowability as compared with a compound including the first powder and the second powder.

A compact according to the present embodiment includes the above-described compound for bonded magnet. The compact is obtained by compressive compaction of the compound packed inside a die. In the present embodiment, compressive compaction of the compound can be performed at normal temperature. Compressive compaction of the compound can also be performed while heating a compound powder.

The bonded magnet according to the present embodiment includes a cured product of the compound for bonded magnet. As a result of a heat treatment of the compact taken out from a die, the resin composition in the compact is cured, and the magnetic particles in the compact are bound to one another by a cured product of the resin composition so that a bonded magnet is obtained.

(Metal Salt $R_2M$)

As mentioned above, R constituting the metal salt $R_2M$ is a saturated fatty acid group having 6 or more and 10 or less carbon atoms. M constituting the metal salt $R_2M$ is at least one metal element selected from Ca and Ba. The saturated fatty acid group R having 6 or more and 10 or less carbon atoms may be at least one saturated fatty acid group selected from the group consisting of a caproic acid group ($CH_3(CH_2)_4COO$—) having 6 carbon atoms, an enanthic acid group ($CH_3(CH_2)_5COO$—) having 7 carbon atoms, a caprylic acid group ($CH_3(CH_2)_6COO$—) having 8 carbon atoms, a pelargonic acid group ($CH_3(CH_2)_7COO$—) having 9 carbon atoms, and capric acid group ($CH_3(CH_2)_8COO$—) having 10 carbon atoms. That is, the metal salt represented by $R_2M$ may include at least one metal salt selected from the group consisting of calcium caproate ($(CH_3(CH_2)_4COO)_2Ca$), barium caproate ($(CH_3(CH_2)_4COO)_2Ba$), calcium enanthate ($(CH_3(CH_2)_5COO)_2Ca$), barium enanthate ($(CH_3(CH_2)_5COO)_2Ba$), calcium caprylate ($(CH_3(CH_2)_6COO)_2Ca$), barium caprylate ($(CH_3(CH_2)_6COO)_2Ba$), calcium pelargonate ($(CH_3(CH_2)_7COO)_2Ca$), barium pelargonate ($(CH_3(CH_2)_7COO)_2Ba$), calcium caprate ($(CH_3(CH_2)_8COO)_2Ca$), and barium caprate ($(CH_3(CH_2)_8COO)_2Ba$). The compound may include a plurality of metal salts among the above-described metal salts. The compound may include a partially saponified saturated fatty acid ester containing the above-described metal salts.

The metal salt represented by $R_2M$ may function as a wax. The term wax means either or both of a lubricating agent and a mold releasing agent. When the metal salt represented by $R_2M$ functions as a wax, since the compound can have excellent flowability derived from the metal salt, the compound is easily shaped into a desired shape. Furthermore, when the metal salt functions as a wax, a compact formed from the compound is easily separated from the die without damaging the compact.

The compound for bonded magnet may include a metal salt represented by RMR', each of R and R' may be a saturated fatty acid group having 6 or more and 10 or less carbon atoms, the numbers of carbon atoms of each of R and R' may be different from each other, and M may be at least one metal element selected from Ca and Ba. The compound for bonded magnet may include at least one metal salt selected from a magnesium salt of a saturated fatty acid and a strontium salt of a saturated fatty acid. For example, the compound for bonded magnet may include at least one metal salt selected from the group consisting of $R_2Mg$, RMgR', $R_2Sr$, and RSrR', and each of R and R' may be a saturated fatty acid group having 6 or more and 10 or less carbon atoms.

The proportion of the mass of the metal salt $R_2M$ may be 0.01 parts by mass or more and 1 part by mass or less, preferably 0.05 parts by mass or more and 0.5 parts by mass or less, and more preferably 0.1 parts by mass or more and 0.3 parts by mass or less, with respect to the total mass (100 parts by mass) of the magnetic powder and the resin composition. For example, the proportion of the mass of the second powder formed from the metal salt $R_2M$ may be 0.01 parts by mass or more and 1 part by mass or less, preferably 0.05 parts by mass or more and 0.5 parts by mass or less, and more preferably 0.1 parts by mass or more and 0.3 parts by mass or less, with respect to the total mass (100 parts by mass) of the first powder formed from the magnetic powder and the resin composition. When the proportion of the metal salt $R_2M$ is less than 0.01 parts by mass, it is difficult to pull out the bonded magnet obtained by compaction of the compound from the die. When the proportion of the metal salt $R_2M$ is larger than 1 part by mass, the mechanical strength of the bonded magnet tends to decrease. However, even when the proportion of the mass of the metal salt $R_2M$ is out of the above-described range, the effect of the present invention can be obtained.

(Epoxy Resin and Curing Agent)

The epoxy resin included in the compound according to the present embodiment has excellent flowability among thermosetting resins. The epoxy resin may be, for example, a resin having two or more epoxy groups in one molecule. It is preferable that the epoxy equivalent of the epoxy resin is 230 or less. By using an epoxy resin having an epoxy equivalent of 230 or less, the number of hydroxyl groups (OH groups) per unit mass of the compound generated by a reaction with a phenol resin as a curing agent is increased. As a result, the mechanical strength of the bonded magnet produced by curing of the compound is enhanced. As the number of hydroxyl groups per unit mass of the compound is larger, the corrosion resistance of the bonded magnet in hydrophobic oil is enhanced.

The epoxy resin may be, for example, at least one selected from the group consisting of a biphenyl type epoxy resin, a stilbene type epoxy resin, a diphenylmethane type epoxy resin, a sulfur atom-containing type epoxy resin, a novolac type epoxy resin, a dicyclopentadiene type epoxy resin, a salicylaldehyde type epoxy resin, a naphthol-phenol copolymerization type epoxy resin, an epoxide of an aralkyl type phenol resin, a bisphenol type epoxy resin, an alcohol glycidyl ether epoxy resin, a glycidyl ether type epoxy resin of a para-xylylene-modified phenol resin and/or a meta-xylylene-modified phenol resin, a glycidyl ether type epoxy resin of a terpene-modified phenol resin, a cyclopentadiene type epoxy resin, a glycidyl ether type epoxy resin of a polycyclic aromatic ring-modified phenol resin, a glycidyl ether type epoxy resin of a naphthalene ring-containing phenol resin, a glycidyl ester type epoxy resin, a glycidyl type or methylglycidyl type epoxy resin, an alicyclic type epoxy resin, a halogenated phenol novolac type epoxy resin, an ortho-cresol novolac type epoxy resin, a hydroquinone type epoxy resin, a trimethylolpropane type epoxy resin, and a linear aliphatic epoxy resin obtained by oxidizing an olefin bond with a peracid such as peracetic acid.

At least a portion of the epoxy resin may be a naphthalene type epoxy resin having a naphthalene structure. A naphthalene type epoxy resin is a solid at normal temperature. As the compound includes the naphthalene type epoxy resin, the bonded magnet is likely to have high mechanical strength at room temperature, the heat resistance of the bonded magnet is likely to be enhanced, and a decrease in the mechanical strength of the bonded magnet at a high temperature is easily suppressed. The naphthalene type epoxy resin may be, for example, at least one epoxy resin selected from the group consisting of a naphthalene diepoxy compound, a naphthylene ether type epoxy resin, a naphthalene novolac type epoxy resin, a methylene-bonded dimer of a naphthalene diepoxy compound, and a methylene-bonded body of a naphthalene monoepoxy compound and a naphthalene diepoxy compound.

It is preferable that the naphthalene type epoxy resin is at least one selected from a trifunctional epoxy resin and a tetrafunctional epoxy resin. It is more preferable that the naphthalene type epoxy resin is a tetrafunctional epoxy resin. When the naphthalene type epoxy resin included in the compound is at least one selected from a trifunctional epoxy resin and a tetrafunctional epoxy resin, the naphthalene type epoxy resin is mutually three-dimensionally crosslinked during the process of curing of the compound, a strong crosslinked network is formed in the bonded magnet, and movement of the naphthalene type epoxy resin in the bonded magnet at a high temperature is easily suppressed. That is, the glass transition temperature of each of a trifunctional epoxy resin and a tetrafunctional epoxy resin is higher than the glass transition temperature of a bifunctional epoxy resin. Therefore, when the naphthalene type epoxy resin included in the compound is at least one selected from a trifunctional epoxy resin and a tetrafunctional epoxy resin, the heat resistance of the bonded magnet is likely to be enhanced, and a decrease in the mechanical strength of the bonded magnet at a high temperature is easily suppressed.

As a commercial product of the trifunctional naphthalene type epoxy resin or the tetrafunctional naphthalene type epoxy resin, for example, HP-4700, HP-4710, HP-4770, EXA-5740, or EXA-7311-G4 manufactured by DIC Corporation may be used. The naphthalene type epoxy resin included in the compound may be a bifunctional epoxy resin. As a commercial product of the bifunctional naphthalene type epoxy resin, HP-4032, HP-4032D, or the like may be used. The naphthalene type epoxy resin included in the compound may be a β-naphthol type epoxy resin.

The compound may include any one kind of epoxy resin among the above-described ones. The compound may include a plurality of kinds of epoxy resins among the above-described ones.

Curing agents are classified into a curing agent that cures an epoxy resin in a temperature range of from low temperatures to room temperature, and a heat-curable type curing agent that cures an epoxy resin along with heating. Examples of the curing agent that cures an epoxy resin in a temperature range of from low temperatures to room temperature include an aliphatic polyamine, polyaminoamide, and polymercaptan. Examples of the heat-curable type curing agent include an aromatic polyamine, an acid anhydride, a phenol novolac resin, and dicyandiamide (DICY).

When a curing agent that cures an epoxy resin in a temperature range of from low temperatures to room temperature is used, the glass transition point of a cured product of the epoxy resin is low, and a cured product of an epoxy resin tends to be soft. As a result, a compact and a bonded magnet formed from the compound are also likely to be soft. Therefore, from the viewpoint of enhancing the heat resistance (mechanical strength at high temperature) of the bonded magnet, the curing agent may be preferably a heat-curable type, more preferably a phenol resin, and even more preferably a phenol novolac resin. Particularly, by using a phenol novolac resin as the curing agent, a cured product of the epoxy resin having a high glass transition point is likely to be obtained. As a result, the heat resistance of the bonded magnet is likely to be enhanced.

A portion or the entirety of the curing agent may be a phenol resin. The phenol resin may be, for example, at least one selected from the group consisting of an aralkyl type phenol resin, a dicyclopentadiene type phenol resin, a salicylaldehyde type phenol resin, a novolac type phenol resin, a benzaldehyde type phenol-aralkyl type phenol copolymerization type phenol resin, a paraxylylene and/or metaxylylene-modified phenol resin, a melamine-modified phenol resin, a terpene-modified phenol resin, a dicyclopentadiene type naphthol resin, a cyclopentadiene-modified phenol resin, a polycyclic aromatic ring-modified phenol resin, a biphenyl type phenol resin, and a triphenylmethane type phenol resin. The phenol resin may be a copolymer constructed of two or more kinds of phenol resins among the above-described ones. As a commercial product of the phenol resin, for example, TAMANOL 758 manufactured by ARAKAWA CHEMICAL INDUSTRIES, LTD. or HP-850N manufactured by Showa Denko Materials Co., Ltd. may be used.

The phenol novolac resin may be, for example, a resin obtainable by condensing or co-condensing a phenol and/or a naphthol and an aldehyde in the presence of an acidic catalyst. The phenol constituting the phenol novolac resin may be, for example, at least one selected from the group consisting of phenol, cresol, xylenol, resorcin, catechol, bisphenol A, bisphenol F, phenylphenol, and aminophenol. The naphthol constituting the phenol novolac resin may be, for example, at least one selected from the group consisting of α-naphthol, β-naphthol, and dihydroxynaphthalene. The aldehyde constituting the phenol novolac resin may be, for example, at least one selected from the group consisting of formaldehyde, acetaldehyde, propionaldehyde, benzaldehyde, and salicyladehyde.

The curing agent may be, for example, a compound having two phenolic hydroxyl groups in one molecule. The compound having two phenolic hydroxyl groups in one molecule may be, for example, at least one selected from the group consisting of resorcin, catechol, bisphenol A, bisphenol F, and substituted or unsubstituted biphenol.

The compound may include one kind of phenol resin among the above-described ones as the curing agent. The compound may include a plurality of kinds of phenol resins among the above-described as the curing agent.

The ratio of the hydroxyl group equivalent of the phenol resin to the epoxy equivalent of the epoxy resin may be 0.5 or more and 1.5 or less, 0.9 or more and 1.4 or less, 1.0 or more and 1.4 or less, or 1.0 or more and 1.2 or less. That is, the ratio of active groups (phenolic OH groups) in the phenol resin that react with epoxy groups in the epoxy resin may be preferably 0.5 equivalent or more and 1.5 equivalent or less, more preferably 0.9 equivalent or more and 1.4 equivalent or less, even more preferably 1.0 equivalent or more and 1.4 equivalent or less, and particularly preferably 1.0 equivalent or more and 1.2 equivalent or less. When the ratio of active groups in the phenol resin is less than 0.5 equivalent, the OH amount per unit weight of the epoxy resin after curing becomes small, and the curing rate of the resin composition (epoxy resin) is decreased. Furthermore, when the ratio of active groups in the phenol resin is less than 0.5 equivalent, the glass transition temperature of a cured product thus obtained is likely to be lowered, it is difficult to obtain a sufficient elastic modulus of the cured product, and the oil resistance of the bonded magnet is likely to be decreased. On the other hand, when the ratio of active groups in the phenol resin is more than 1.5 equivalent, the mechanical strength of a bonded magnet formed from the compound tends to be decreased. However, even when the ratio of active groups in the phenol resin is out of the above-described range, the effect according to the present invention is obtained.

(Curing Accelerator)

The curing accelerator may be, for example, a composition that reacts with an epoxy resin and accelerates curing of the epoxy resin, and the curing accelerator is not limited. It is preferable that the curing accelerator is a phosphorus-based curing accelerator. The phosphorus-based curing accelerator may be at least one curing accelerator selected from the group consisting of triphenylphoshine benzoquinone, tris-4-hydroxyphenylphosphine benzoquinone, tetraphenylphosphonium tetrakis(4-methylphenyl)borate, tetra (n-butyl)phosphonium tetraphenylborate, and the like. A bonded magnet produced from a compound including the above-described curing accelerator is likely to have excellent mechanical strength. Furthermore, a compound including the above-described curing accelerator is likely to be stably stored over a long time period even in a high-temperature and high-humidity environment. The curing accelerator may be, for example, an imidazole such as an alkyl group-substituted imidazole or benzimidazole. The compound may include one kind of curing accelerator. The compound may include a plurality of kinds of curing accelerators.

The blending amount of the curing accelerator may be any amount with which a curing acceleration effect is obtained, and the blending amount is not particularly limited. However, from the viewpoint of improving the curability at the time of moisture absorption and flowability of the resin composition, the blending amount of the curing accelerator may be preferably 0.1 parts by mass or more and 30 parts by mass or less, and more preferably 1 part by mass or more and 15 parts by mass or less, with respect to 100 parts by mass of the epoxy resin. The content of the curing accelerator is preferably 0.001 parts by mass or more and 5 parts by mass or less with respect to the sum of the masses of the epoxy resin and the curing agent (for example, a phenol resin). When the blending amount of the curing accelerator is less than 0.1 parts by mass, it is difficult to obtain a sufficient curing acceleration effect. When the blending amount of the curing accelerator is more than 30 parts by mass, the storage stability of the compound is likely to be decreased. However, even when the blending amount and content of the curing accelerator are out of the above-described ranges, the effect according to the present invention is obtained.

(Coupling Agent)

The coupling agent may be a coupling agent that reacts with a glycidyl group carried by the epoxy resin. The coupling agent enhances close adhesiveness between the magnetic particles and the resin composition (epoxy resin) and enhances the mechanical strength of each of the compact formed from the compound powder and the bonded magnet. As the coupling agent that reacts with a glycidyl group, for example, a silane-based compound (silane coupling agent) is preferred. The silane coupling agent may be, for example, at least one selected from the group consisting of epoxysilane, mercaptosilane, aminosilane, alkylsilane, ureidosilane, an acid anhydride-based silane, and vinylsilane.

It is preferable that a portion or the entirety of the coupling agent has a succinic anhydride group. As the coupling agent has a succinic anhydride group, the close adhesiveness between the magnetic particles and the resin composition (epoxy resin) is likely to be enhanced, the coupling agent is likely to be crosslinked with the epoxy resin in a highly humid environment, and the heat resistance and weather resistance of the bonded magnet are likely to be enhanced. The compound may include one kind of coupling agent among the above-described ones. The compound may include a plurality of kinds of coupling agents among the above-described ones.

(Other Additives)

From the viewpoints of environmental safety, recyclability, compaction processability, and low cost of the compound, the compound may include a flame retardant. The flame retardant may be, for example, at least one selected from the group consisting of a bromine-based flame retardant, a phosphorus-based flame retardant, a hydrated metal compound-based flame retardant, a silicone-based flame retardant, a nitrogen-containing compound, a hindered amine compound, an organometallic compound, and an aromatic high-performance plastic. The compound may include one kind of flame retardant among the above-described ones or may include a plurality of kinds of flame retardants among the above-described ones.

(Wax)

The compound may include a wax in addition to the metal salt $R_2M$. When the compound includes a wax, flowability and compaction properties of the compound are enhanced, and mold releasability of the compound is enhanced. As a result, the accuracy of the shape and dimension of the bonded magnet is enhanced, and the structural defect of the bonded magnet is easily suppressed. However, when the metal salt $R_2M$ sufficiently functions as a wax, it is preferable that the compound includes only the metal salt $R_2M$ among the metal salt $R_2M$ and other waxes. As the compound does not include a wax other than the metal salt $R_2M$, the mechanical strength of the bonded magnet at room temperature and high temperatures is easily enhanced. For a similar reason, when the compound includes both the metal salt $R_2M$ and another wax, it is preferable that the content (unit: % by mass) of the metal salt $R_2M$ in the compound is larger than the content of the other wax in the compound. The wax may be, for example, at least any one among a saturated fatty acid, a saturated fatty acid salt, and a saturated fatty acid ester. The wax may be, for example, at least one selected from the group consisting of lauric acid, myristic acid, pentadecylic acid, palmitic acid, margaric acid, stearic acid, arachidic acid, heneicosylic acid, behenic acid, lignoceric acid, cerotic acid, montanoic acid, melissic acid, calcium laurate, calcium myristate, calcium pentadecylate, calcium palmitate, calcium margarate, calcium stearate, calcium arachidate, calcium heneicosylate, calcium behenate, calcium lignocerate, calcium cerotate, calcium montanoate, calcium melissate, barium laurate, barium myristate, barium pentadecylate, barium palmitate, barium margarate, barium stearate, barium arachidate, barium heneicosylate, barium behenate, barium lignocerate, barium cerotate, barium montanoate, barium melissate, a lauric acid ester, a myristic acid ester, a pentadecylic acid ester, a palmitic acid ester, a margaric acid ester, a stearic acid ester, an arachidic acid ester, a heneicosylic acid ester, a behenic acid ester, a lignoceric acid ester, a cerotic acid ester, a montanoic acid ester, and a melissic acid ester. The compound may also include a wax other than the above-described ones. For example, the wax may be at least one selected from the group consisting of magnesium salts of the above-described saturated fatty acids, aluminum salts of the above-described saturated fatty acids, 12-oxystearic acid, calcium ricinolate, stearic acid amide, oleic acid amide, erucic acid amide, behenic acid amide, palmitic acid amide, lauric acid amide, hydroxystearic acid amide, methylenebisstearic acid amide, ethylenebisstearic acid amide, ethylenebislauric acid amide, distearyladipic acid amide, ethylenebisoleic acid amide, dioleyladipic acid amide, N-stearylstearic acid amide, N-oleylstearic acid amide, N-stearylerucic acid amide, methylolstearic acid amide, methylolbehenic acid amide, ethylene glycol, stearyl alcohol, polyethylene glycol, polypropylene glycol, polytetramethylene glycol, silicone oil, silicon lubricant, a fluorine-based oil, a fluorine-based lubricant, a fluorine-containing resin powder, paraffin wax, polyethylene wax, amide wax, polypropylene wax, ester wax, carnauba wax, and microwax. The compound may include one kind of wax among the above-described ones. The compound may include a plurality of kinds of waxes among the above-described ones.

(Organic Solvent)

In the production process of the compound, a uniform compound can be obtained by coating the surface of individual magnetic particles constituting the magnetic powder with an organic solvent in which the resin composition is dissolved. The organic solvent is not limited as long as it is a solvent that can dissolve the resin composition. The organic solvent may be, for example, at least one solvent selected from the group consisting of acetone, methyl ethyl ketone, methyl isobutyl ketone, benzene, toluene, and xylene. In the case of considering workability, it is preferable that the organic solvent is a liquid at normal temperature, and it is preferable that the boiling point of the organic solvent is 60° C. or higher and 150° C. or lower. Such a solvent is preferably, for example, acetone or methyl ethyl ketone.

(Magnetic Powder)

The magnetic powder is not limited as long as the magnetic powder does not deteriorate the curing characteristics of the resin composition. The magnetic powder may be, for example, a powder of a samarium-cobalt (Sm—Co)-based alloy (rare earth magnet), a powder of a neodymium-iron-boron (Nd—Fe—B)-based alloy (rare earth magnet), a powder of a samarium-iron-nitrogen (Sm—Fe—N)-based alloy (rare earth magnet), a powder of an iron-cobalt (Fe—Co)-based alloy (alloy magnet), a powder of an Al—Ni—Co-based alloy (AlNiCo magnet), or a powder of a ferrite-based magnet.

The shape of the individual magnetic particles constituting the magnetic powder is not particularly limited. The individual magnetic particles may be flat. The individual magnetic particles may have, for example, a spherical shape or a needle-like shape. The particle size of the magnetic powder may be, for example, 20 μm or more and 300 μm or less, or 40 μm or more and 250 μm or less. The particle size of the magnetic powder may be calculated on the basis of the mass measurement of the magnetic particles by means of sieving. The particle size of the magnetic powder may be measured by using a laser diffraction type particle size distribution analyzer. The compound may include a plurality of kinds of magnetic powders having different average particle sizes or median diameters (D50).

(Inorganic Filler)

The compound may include an inorganic filler. The inorganic filler may be composed of one kind of particles. The inorganic filler may be a combination of two or more kinds of particles. The average particle size of the inorganic filler may be 1 μm or more and 100 μm or less, preferably 1 μm or more and 50 μm or less, more preferably 1 μm or more and 20 μm or less, and particularly preferably 1.5 μm or more and 10 μm or less. It is preferable that the inorganic filler is a mixture of a plurality of kinds of fillers having different average particle sizes. As a result, the atomic packing factor of the bonded magnet can be increased.

A preferred inorganic filler is silica ($SiO_2$) particles. The silica particles may be, for example, spherical silica obtainable by a sol-gel method, crushed silica micronized by pulverization, dry silica, or wet silica. As a commercial product of the spherical silica, MSR-2212, MSR-SC3, MSR-SC4, MSR-3512, MSR-FC208 (all trade names of Tatsumori, Ltd.), EXCELICA (all trade name of Tokuyama Corporation), SO-E1, SO-E2, SO-E3, SO-E5, SO-E6, SO-C1, SO-C2, SO-C3, SO-C5, or SO-C6 (all trade names of Admatechs Co., Ltd.) may be used. As a commercial product of the crushed silica, CRYSTALITE 3K-S, NX-7, MCC-4, CMC-12, A1, AA, CMC-1, VX-S2, VX-SR (all trade names of Tatsumori, Ltd.), F05, F05-30, or F05-12 (all trade names of Fumitec Minerals Pte Ltd.) may be used. Dry silica such as RHEROSIL, or wet silica such as Tokusil and Finesil (all trade names of Tokuyama Corporation) may also be used.

It is preferable that the surface of the silica particles is treated with a silane coupling agent. As a result of attachment of a silane coupling agent to the surface of the silica particles, settling of the silica particles in the compound is suppressed, and a bonded magnet in which silica particles are stably dispersed can be obtained. The silane coupling agent for surface treatment of the silica particles may be, for example, at least one coupling agent selected from the group consisting of vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, n-2-(aminoethyl)-3-aminopropylmethyldimethoxysilanetriethoxysilane, n-2-(aminoethyl)-3-aminopropyltrimethoxysilane, n-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, hydrochloride of N-(vinylbenzyl)-2-aminoethyl-3-aminopropyltrimethoxysilane, 3-ureidopropyltriethoxysilane, 3-mercaptopropylmethyldimethoxysilane, 3-mercaptopropyltrimethoxysilane, bis(triethoxysilylpropyl) tetrasulfide, 3-isocyanatopropyltriethoxysilane, polycondensate of dimethylsilane, polycondensate of diphenylsilane, and copolycondensate of dimethylsilane and diphenylsilane. Among those described above, a silane coupling agent having an amino group is particularly preferred.

[Method for Producing Compound for Bonded Magnet, Compact, and Bonded Magnet]

A solution of a resin composition is obtained by dissolving raw materials of the resin composition, such as an epoxy resin, a curing agent (phenol resin or the like), a curing accelerator, and a coupling agent, in an organic solvent. A magnetic powder is added to the solution of the resin composition to disperse the magnetic powder in the solution of the resin composition, and then the organic solvent is removed from the solution including the magnetic powder and the resin composition by distillation under reduced pressure and drying. As a result, the surface of the individual magnetic particles constituting the magnetic powder is covered with the resin composition, and a first powder formed from the magnetic powder and the resin composition is obtained. When a compound including an inorganic filler is produced, the inorganic filler may be added to the solution of the resin composition together with the magnetic powder. As described above, it is preferable that a surface treatment of the inorganic filler by a silane coupling agent is carried out in advance.

In the step of removing the organic solvent from the solution including the magnetic powder and the resin composition, it is preferable to perform distillation under reduced pressure of the organic solvent at normal temperature while stirring the solution by using an evaporator. The first powder may be obtained by further drying the solid obtained by distillation under reduced pressure in a reduced-pressure drier or the like and then appropriately pulverizing the solid. Instead of distillation under reduced pressure, it is also acceptable to perform distillation at normal pressure while stirring the solution with a kneader or the like. As a method for drying the solid obtained by distillation, heating is not preferred. However, the solid may be dried by heating of the solid at 80° C. or lower, and preferably 60° C. or lower.

The compound for bonded magnet may be obtained by mixing the first powder obtained according to the above-described method and a second powder including the metal salt $R_2M$.

A compact is obtained by compressive compaction of the compound packed in a die. As the compaction pressure is higher, the residual magnetic flux density and mechanical strength of the bonded magnet are increased. The compaction pressure may be, for example, 500 MPa or greater and 2500 MPa or less. When the mass productivity and the life of the die are also taken into consideration, the compaction pressure may be 1400 MPa or greater and 2000 MPa or less. The density of the compact may be preferably 75% or more and 90% or less, and more preferably 80% or more and 86% or less, with respect to the true density of the magnetic powder. When the density of the compact is 75% or more and 86% or less with respect to the true density of the magnetic powder, a bonded magnet having excellent magnetic characteristics and mechanical strength can be produced.

The resin composition in the compact may be cured by a heat treatment of the compact, the magnetic particles in the compact are bound to one another with a cured product of the resin composition, and a bonded magnet is obtained. The heat treatment temperature of the compact may be any temperature at which the resin composition sufficiently cures. The heat treatment temperature of the compact may be, for example, 150° C. or higher and 300° C. or lower, and preferably 175° C. or higher and 250° C. or lower. In order to suppress oxidation of the magnetic powder in the compact, it is preferable to perform the heat treatment of the compact in an inert atmosphere. When the heat treatment temperature is higher than 300° C., the magnetic powder is easily oxidized by a trace amount of oxygen that is unavoidably included in the compact during the production process, and the cured product of the resin composition is likely to be deteriorated. Furthermore, in order to suppress oxidation of the magnetic powder and deterioration of the cured product of the resin composition, the time for maintaining the above-described heat treatment temperature may be several minutes or more and 4 hours or less, and preferably 5 minutes or more and 1 hour or less.

[Glass Transition Temperature of Resin Cured Product Cured Body Suitable for Bonded Magnet]

The glass transition temperature of a cured product of the resin composition in the bonded magnet may be preferably 150° C. or higher, and more preferably 200° C. or higher. The glass transition temperature means a temperature at which tan 6 reaches a peak in the dynamic viscoelasticity measurement. When the glass transition temperature of the cured product of the resin composition is 150° C. or higher, a decrease in the mechanical strength of the bonded magnet in a severe high-temperature environment is easily suppressed.

The present invention is not necessarily limited to the above-described embodiments. Various modifications of the present invention can be made as long as the gist of the present invention is maintained, and these modification examples are also included in the present invention.

EXAMPLES

The present invention will be described in detail by way of the following Examples and Comparative Examples. The present invention is not intended to be limited by the following Examples.

Example 1

As raw materials of a resin composition, an epoxy resin, a curing agent, a curing accelerator, a coupling agent, and a solvent were used. These raw materials were mixed in a plastic container and were further stirred for 60 minutes, and thus a solution of the resin composition (resin solution) was prepared. The blending ratio of each raw material in the resin solution is shown in the following Table 1. For the stirring of the raw materials, a mixing rotor was used. The speed of rotation of the mixing rotor was 40 rpm.

As the epoxy resin, HP-4700 manufactured by DIC Corporation was used. HP-4700 is a tetrafunctional naphthalene type epoxy resin. The epoxy equivalent of HP-4700 is 160 g/eq. The softening point of HP-4700 is 64° C.

As the curing agent, HP-850N manufactured by Showa Denko Materials Co., Ltd. was used. HP-850N is a phenol novolac resin (novolac type curing agent). The hydroxyl group equivalent of HP-850N is 108 g/eq.

The ratio of the hydroxyl group equivalent of the phenol novolac resin to the epoxy equivalent of the epoxy resin was adjusted to 1.0 (unit: eq/eq).

As the curing accelerator, PX-4PB manufactured by NIPPON CHEMICAL INDUSTRIAL CO., LTD. was used. PX-4PB is tetra(n-butyl)phosphonium tetraphenylborate ($Bu_4P^+B(Ph)_4^-$).

As the coupling agent, X-12-967C manufactured by Shin-Etsu Chemical Co., Ltd. was used. X-12-967C is 3-trimethoxysilylpropylsuccinic anhydride. That is, X-12-967C is a silane coupling agent having a succinic anhydride group.

As the solvent, methyl ethyl ketone (2-butanone) was used.

The above-described resin solution and magnetic powder were taken in a pear-shaped flask. As the magnetic powder, an Nd—Fe—B-based alloy powder was used. The Nd—Fe—B-based alloy powder was MQP-B manufactured by Magnequench International, LLC. The average particle size of the Nd—Fe—B-based alloy powder was 100 μm. The mass (unit: g) of the magnetic powder used for the production of the magnet compound is shown in the following Table 1. The capacity of the flask was 300 mL. The content of the flaks was stirred for about 30 minutes at 25° C. by using an evaporator. By reducing the pressure inside the evaporator to 0.1 MPa or lower, the solvent in the flaks was distilled off. In the process of distilling off the solvent, in order to sufficiently remove the solvent, an operation of reducing the pressure inside the flask, an operation of returning the pressure inside the flask to normal pressure, and an operation of loosening the aggregated content in the flask were repeated several times in this order. After distillation of the solvent, a mixture of the resin composition and the magnetic powder was collected from the flask, and the mixture was spread over a flat dish. The mixture on the flat dish was dried at normal temperature for 8 hours by a vacuum dryer. After drying of the mixture, a first powder was obtained by crude pulverization of the aggregated mixture. The first powder is a powder composed of an Nd—Fe—B-based alloy powder and a resin composition covering each of the alloy particles constituting the Nd—

Fe—B-based alloy powder. The particle size of the first powder was adjusted by removing a coarse powder from the first powder with a 100-mesh sieve.

The first powder was taken in a plastic bottle, and 0.2 g of calcium caprylate (second powder) was added to the first powder. A magnet compound was obtained by mixing the first powder and the second powder for 60 minutes in a V-type mixer. The capacity of the plastic bottle was 250 ml.

A compact was obtained by compressive compaction of a compound for bonded magnet using a hydraulic press machine. Compressive compaction of the compound was performed at normal temperature. The compaction pressure was 2000 MPa. The compact was a cube having a size of 7 mm×7 mm×7 mm. A cube-shaped bonded magnet was obtained by heating the compact at 200° C. for 10 minutes in an atmosphere composed of nitrogen gas ($N_2$).

<Measurement of Crushing Strength>

A compression pressure was applied to an end face of the bonded magnet by using a universal compression testing machine. That is, a compression pressure was applied to the bonded magnet in the height direction of the bonded magnet. The compression pressure was increased, and the compression pressure at the time when the bonded magnet was destroyed was measured. The compression pressure at the time when the bonded magnet was destroyed means crushing strength (unit: MPa). As the universal compression testing machine, AG-10TBR manufactured by SHIMADZU CORPORATION was used. The speed of the crosshead in the measurement of the crushing strength was 0.5 mm/min. The measurement of the crushing strength was carried out in an air atmosphere at room temperature (25° C.). The crushing strength of Example 1 is shown in the following Table 1.

<Measurement of Density of Compact>

In order to measure the density of the compact, a compact was produced by the above-described method. The mass of the compact was measured with an electronic balance. The volume of the compact was measured from the above-described dimensions of the compact. The density of the compact of Example 1 was calculated by dividing the mass of the compact by the volume of the compact. The density of the compact of Example 1 is shown in the following Table 1.

<Evaluation of Rust-Preventiveness>

In order to measure the rust-preventiveness of a compact, a compact was produced by the above-described method. The entirety of the compact was immersed in pure water held in a container. After sealing of the container, the compact immersed in pure water was left to stand in an air atmosphere at room temperature. From the day on which the compact was immersed in pure water, the time (unit: day) taken until brown rust leaked out from the compact was measured. The rust-preventiveness of the compact of Example 1 is shown in the following Table 1.

Examples 2 to 6 and Comparative Examples 1 to 3

In Examples 2 and 4, calcium caproate was used instead of calcium caprylate, as the metal salt of a saturated fatty acid.

In Examples 3, 5, and 6, calcium caprylate was used as the metal salt of a saturated fatty acid in the same manner as in Example 1.

In Comparative Example 1, barium stearate was used instead of calcium caprylate, as the metal salt of a saturated fatty acid.

In Comparative Example 2, zinc stearate was used instead of calcium caprylate, as the metal salt of a saturated fatty acid.

In Comparative Example 3, calcium stearate was used instead of calcium caprylate, as the metal salt of a saturated fatty acid.

The mass of each raw material used for the production of the compound for bonded magnet of each of Examples 2 to 6 and Comparative Examples 1 to 3 is shown in the following Table 1.

The compound for bonded magnet, compact, and bonded magnet of each of Examples 2 to 6 and Comparative Examples 1 to 3 were produced by methods similar to those of Example 1, except for the above-described items. The crushing strength of the bonded magnet of each of Examples 2 to 6 and Comparative Examples 1 to 3 was measured by a method similar to that of Example 1. The crushing strength of each of Examples 2 to 6 and Comparative Examples 1 to 3 is shown in the following Table 1. The density of the compact of each of Examples 2 to 6 and Comparative Examples 1 to 3 was measured by a method similar to that of Example 1. The density of the compact of each of Examples 2 to 6 and Comparative Examples 1 to 3 is shown in the following Table 1.

Rust-preventiveness of the compact of each of Examples 2 to 6 and Comparative Examples 1 to 3 was evaluated by a method similar to that of Example 1. The rust-preventiveness of the compact of each of Examples 2 to 6 and Comparative Examples 1 to 3 is shown in the following Table 1.

In the case of Examples 1 to 6, at the time point when six months had passed after the compact was immersed in pure water, leakage of rust from the compact was not observed by visual inspection. That is, in the case of Examples 2 to 6, rust of the magnetic powder included in the compact was suppressed for six months. On the other hand, in the case of Comparative Examples 1 to 3, at the time point when two days had passed after the compact was immersed in pure water, leakage of rust from the compact was observed by visual inspection.

TABLE 1

| | | Unit | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| Resin composition | Epoxy resin | g | 1.58 | 1.58 | 1.02 | 1.02 | 1.58 | 1.58 | 1.02 | 1.58 | 1.58 |
| | Curing agent | g | 1.07 | 1.07 | 0.69 | 0.69 | 1.07 | 1.07 | 0.69 | 1.07 | 1.07 |
| | Curing accelerator | g | 0.09 | 0.09 | 0.06 | 0.06 | 0.09 | 0.09 | 0.06 | 0.09 | 0.09 |

TABLE 1-continued

| | | Unit | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| | Coupling agent | g | 0.456 | 0.456 | 0.294 | 0.294 | 0.456 | 0.456 | 0.294 | 0.456 | 0.456 |
| Solvent | | g | 30 | 30 | 30 | 30 | 30 | 30 | 30 | 30 | 30 |
| Magnetic powder | | g | 96.9 | 96.9 | 98 | 98 | 96.9 | 96.9 | 98 | 96.9 | 96.9 |
| Metal salt | Calcium caprylate | g | 0.2 | 0 | 0.2 | 0 | 0.1 | 0.3 | 0 | 0 | 0 |
| | Calcium caproate | g | 0 | 0.2 | 0 | 0.2 | 0 | 0 | 0 | 0 | 0 |
| | Barium stearate | g | 0 | 0 | 0 | 0 | 0 | 0 | 0.2 | 0 | 0 |
| | Zinc stearate | g | 0 | 0 | 0 | 0 | 0 | 0 | 0 | 0.2 | 0 |
| | Calcium stearate | g | 0 | 0 | 0 | 0 | 0 | 0 | 0 | 0 | 0.2 |
| Mass of metal salt/total mass of resin composition | | g/g | 0.2/3.196 | 0.2/3.196 | 0.2/2.064 | 0.2/2.064 | 0.1/3.196 | 0.3/3.196 | 0.2/2.064 | 0.2/3.196 | 0.2/3.196 |
| Crashing strength | | MPa | 334 | 369 | 330 | 335 | 362 | 320 | 313 | 245 | 279 |
| Density | | $g/cm^3$ | 6.12 | 6.12 | 6.13 | 6.13 | 6.13 | 6.11 | 6.11 | 6.08 | 6.09 |
| Rust-preventiveness | | — | No rust for 6 months | No rust for 6 months | No rust for 6 months | No rust for 6 months | No rust for 6 months | No rust for 6 months | NG after 2 days | NG after 2 days | NG after 2 days |

INDUSTRIAL APPLICABILITY

A bonded magnet having excellent mechanical strength can be produced by using the compound for bonded magnet according to an aspect of the present invention.

The invention claimed is:

1. A compound for bonded magnet, comprising:
a magnetic powder;
an epoxy resin;
a curing agent;
a coupling agent; and
a metal salt,
wherein the metal salt is represented by $R_2M$,
the R represents a saturated fatty acid group having 6 or more and 10 or less carbon atoms, and
the M represents at least one metal element selected from Ca and Ba.

2. The compound for bonded magnet according to claim 1,
wherein at least a portion of the epoxy resin is a naphthalene type epoxy resin having a naphthalene structure.

3. The compound for bonded magnet according to claim 2,
wherein the naphthalene type epoxy resin is at least one of a trifunctional epoxy resin and a tetrafunctional epoxy resin.

4. The compound for bonded magnet according to claim 1,
wherein at least a portion of the curing agent is a phenol resin, and
a ratio of a hydroxyl group equivalent of the phenol resin to an epoxy equivalent of the epoxy resin is 1.0 or more and 1.4 or less.

5. The compound for bonded magnet according to claim 1,
wherein at least a portion of the coupling agent has a succinic anhydride group.

6. The compound for bonded magnet according to claim 1, comprising:
a first powder including the magnetic powder and a resin composition covering each of magnetic particles constituting the magnetic powder; and
a second powder including the metal salt,
wherein the resin composition includes the epoxy resin, the curing agent, and the coupling agent.

7. A compact comprising:
the compound for bonded magnet according to claim 1.

8. The compact according to claim 7,
wherein at least a portion of the surface of a portion or all of magnetic particles constituting the magnetic powder is covered with a resin composition,
the resin composition includes the epoxy resin, the curing agent, and the coupling agent, and
the metal salt is dispersed in the compact.

9. A bonded magnet comprising:
a cured product of the compound for bonded magnet according to claim 1.

10. The bonded magnet according to claim 9,
wherein at least a portion of the surface of a portion or all of magnetic particles constituting the magnetic powder is covered with a resin composition,
the resin composition includes the epoxy resin, the curing agent, and the coupling agent, and
the metal salt is dispersed in the bonded magnet.

* * * * *